United States Patent [19]

Kurashige et al.

[11] Patent Number: 5,315,394
[45] Date of Patent: May 24, 1994

[54] AUTO-IRIS METHOD AND APPARATUS FOR IMAGING DEVICE

[75] Inventors: Tomoyuki Kurashige; Takuya Imaide, both of Yokohama; Hiroyuki Tarumizu, Fujisawa, all of Japan

[73] Assignees: Hitachi, Ltd, Tokyo; Hitachi Video & Information System, Inc., Kanagawa, both of Japan

[21] Appl. No.: 754,398

[22] Filed: Sep. 3, 1991

[30] Foreign Application Priority Data

Sep. 4, 1990 [JP] Japan .................. 2-232348

[51] Int. Cl.⁵ ............................... H04N 5/225
[52] U.S. Cl. ........................ 348/229; 348/364
[58] Field of Search ............ 358/228, 209, 906, 909, 358/213.14, 41; H04N 5/225, 5/232

[56] References Cited

U.S. PATENT DOCUMENTS

| | | | |
|---|---|---|---|
| 4,365,272 | 12/1982 | Nagai | 358/228 |
| 4,472,743 | 9/1984 | Ogasawara et al. | 358/228 |
| 4,562,476 | 12/1985 | Shikano et al. | 358/228 |
| 4,584,610 | 4/1986 | Mizokami et al. | 358/228 |
| 5,049,997 | 9/1991 | Arai | 358/213.19 X |
| 5,065,247 | 11/1991 | Haruki | 358/213.19 X |
| 5,101,275 | 3/1992 | Wijnen | 358/209 |
| 5,111,301 | 5/1992 | Haruki et al. | 358/228 |

*Primary Examiner*—Mark R. Powell
*Attorney, Agent, or Firm*—Antonelli, Terry Stout & Kraus

[57] ABSTRACT

An auto-iris method for an imaging device includes the steps of obtaining a first signal indicating brightness of an object from a signal output from an imaging element; comparing a level of the first signal with a level of a reference signal; and enhancing a level of the reference signal more as the object becomes brighter and controlling an iris to path more quantity of light to the imaging element, based on the compared result.

40 Claims, 4 Drawing Sheets

F — VALUE
← SMALL    LARGE →

AUTO-IRIS METHOD AND APPARATUS FOR IMAGING DEVICE

BACKGROUND OF THE INVENTION

The present invention relates to an auto-iris method and apparatus which are suitable to a video camera.

In general, a video camera for domestic use provides an auto-iris mechanism as shown in JP-A-56-19274, for example. This mechanism serves to automatically change an iris depending on quantity of incident light so that it can constantly keep an amplitude of a resulting video signal constant against change of brightness of an object to be imaged and the background of the object. Now, the description will be directed to the conventional auto-iris mechanism with reference to FIG. 1, in which 1 is a lens, 2 is an iris, 3 is an imaging element, 4 is a signal processing circuit, 5 is an output terminal, 6 is an image detecting circuit, 7 is a level comparing circuit, 8 is a reference voltage source, and 9 is an iris driving motor.

A ray of light is reflected on an object and is incident to the lens 1 and the iris 2. Then, the ray of light is applied to the imaging element 3 on which the image of the object is formed. The imaging element 3 picks up the formed image and generates an electric signal corresponding to the image. The electric signal is sent to the signal processing circuit 4 in which the video signal corresponding to the image is generated. Then, the video signal is supplied as an imaging output at the output terminal 5.

In the process for generating the video signal in the signal processing circuit 4, a luminance signal is supplied to the image detecting circuit 6. The image detecting circuit 6 serves to weight the luminance signal at each spot on a screen, detect an amplitude of the luminance signal, and output a detected voltage V1 having a level corresponding to the amplitude. The level comparing circuit 7 serves to compare the level of the detected voltage V1 with the level of a constant reference voltage $V_{ref}$ fed from the reference voltage source 8 and control the iris driving motor 9 depending on the compared result so that the iris 2 may be adjusted so as to match the detected voltage V1 to the reference voltage $V_{ref}$. It results in keeping the amplitude of the video signal output at the output terminal 5 constant independently of the brightness of the object and the background thereof.

As set forth above, the conventional auto-iris mechanism serves to keep the amplitude of a video signal obtained from an object constant however variable the brightness of the object and the background thereof are. It was the essential function. This function, however, may bring about the following disadvantages.

(1) Considering that an object to be images is blue sky on the overall screen and another object is lawn on the overall screen, the amplitudes of the video signals for both objects are kept constant, though the blue sky is brighter than the lawn. The auto-iris operation is done to keep the brightness of a regenerative screen equal in each of the objects. Hence, the blue sky on the regenerative screen is dimmer than the actual blue sky and the lawn on the regenerative screen is far more luminous than the actual sky, resulting in inclining the color of the lawn to white. It is thus impossible to represent the difference of brightness between the objects on the regenerative screen.

(2) The brightness of the background of an object is different at respective times such as early morning, midday, and evening and on the weather conditions such as fine, cloudy, and rainy ones. The foregoing conventional auto-iris mechanism, however, keeps the brightness of the regenerative screens equal in respective backgrounds, resulting in disallowing the difference of the brightness between respective backgrounds to appear on the regenerative screen.

SUMMARY OF THE INVENTION

To overcome the foregoing disadvantages, it is therefore an object of the present invention to provide an auto-iris method and apparatus for an imaging device which are capable of representing respective brightnesses of objects and backgrounds on the corresponding regenerative screens for obtaining a natural regenerative image.

In carrying out the object in a preferred mode, the present invention includes means for detecting brightnesses of an object to be imaged and a background of an object so that an amplitude of an output video signal of an imaging device is allowed to be changed depending on the detected output of the means. Concretely, in case of picking up an image having a relatively brighter object and background, the amplitude of the resulting video signal can be controlled to be larger than that controlled by the conventional auto-iris method and apparatus. It results in allowing the regenerative screen to be relatively brighter, that is, have the brightness corresponding to the actual brightness. Conversely, in case of picking up an image having a relatively less bright object and background, the amplitude of the resulting video signal can be controlled to be smaller than that controlled by the conventional auto-iris method and apparatus. It results in allowing the regenerative screen to be relatively less bright, that is, have the brightness corresponding to the actual brightness.

Accordingly, the present invention is capable of advantageously obtaining a natural regenerative screen depending on the brightness of an object or a background of the object.

DESCRIPTION OF THE PREFERRED EMBODIMENT

Herein, the embodiments of the invention will be described with reference to the appended drawings.

Figure 1:
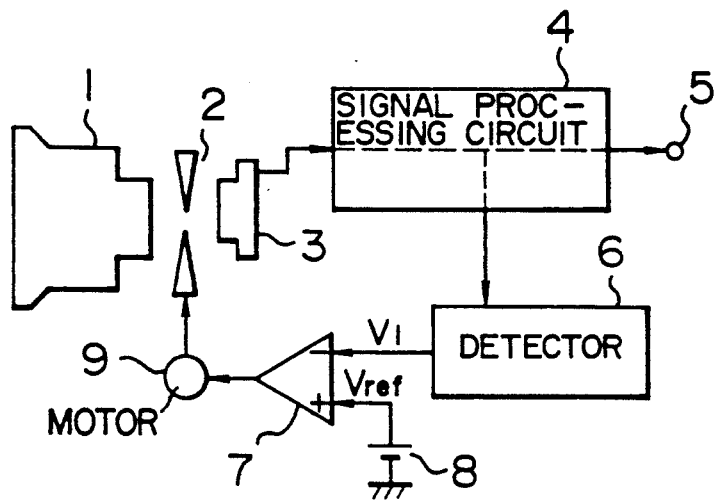
FIG. 1 is a block diagram showing an auto-iris apparatus according to a prior art.
Figure 2:
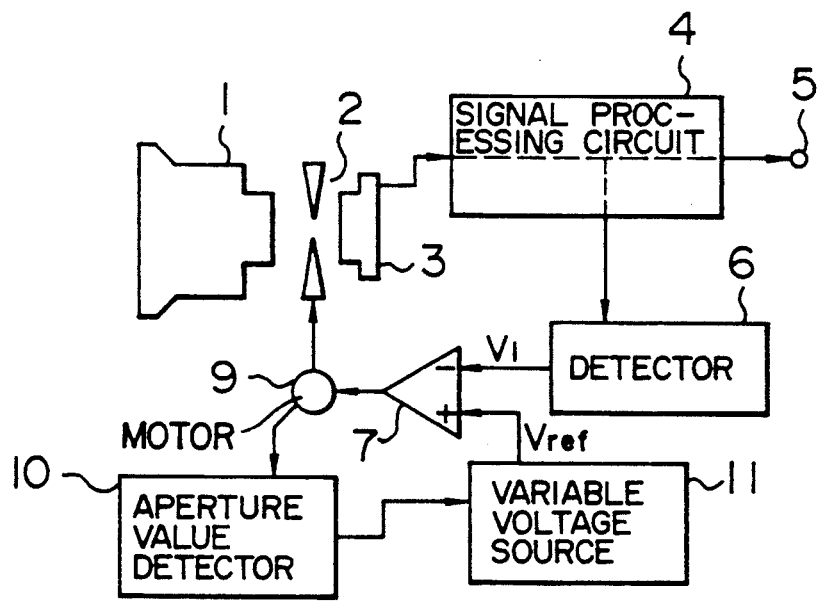
FIG. 2 is a block diagram showing an auto-iris apparatus for an imaging device according to an embodiment of the present invention.

FIG. 2 is a block diagram showing an auto-iris apparatus for an imaging device according to an embodiment of the present invention. 10 is an aperture value detector and 11 is a variable reference voltage source. The other components are equivalent to those shown in FIG. 1. Hence, those components are referenced by the same numbers and are not further described herein.

The quantity of light incident to the lens 1 is changed depending on the brightness of an object. In the present invention, an object means an overall scene to be imaged.

In FIG. 2, the image detecting circuit 6 outputs a detected voltage V1 to the level comparing circuit 7 in which the detected voltage V1 is compared with a reference voltage $V_{ref}$. Depending on the compared result, the driving motor 9 is controlled so that the iris 2 is opened or closed according to the control. At a time, the aperture value detector 10 serves to detect an aperture value or F-value based on an angle of rotation of the driving motor 9. The variable reference voltage source 11 is allowed to be controlled depending on the detected output. The variable reference voltage source 11 generates the reference voltage $V_{ref}$ depending on the detected output of the iris value detector 10.

Figure 3A:
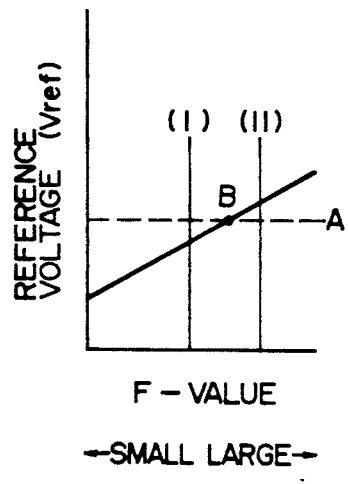
FIGS. 3A to 3C are plots showing relation an aperture value and a reference value according to the embodiment shown in FIG. 2.
Figure 3B:
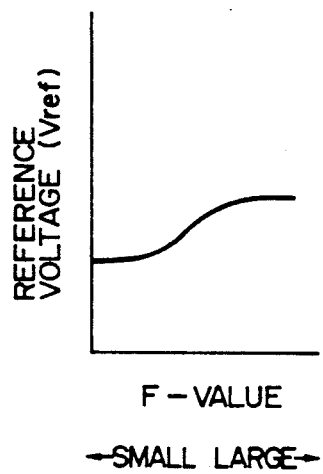
Figure 3C:
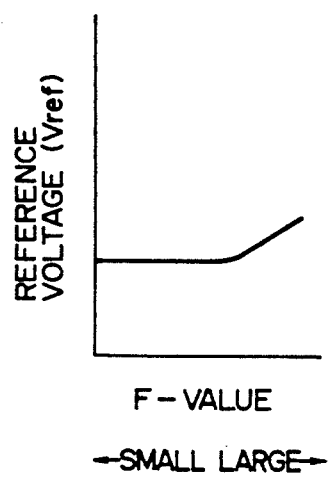

As the iris value is made larger, that is, the iris 2 is closed more, the reference voltage $V_{ref}$ is made higher. FIGS. 3A, 3B and 3C show the relations between the aperture values and the reference values ($V_{ref}$). In FIG. 3A, a broken line A indicates the relation between the aperture value and the reference voltage in the prior art. The relations shown in FIGS. 3B and 3C are assumed to be nonlinear. In any case of FIGS. 3A to 3C, as the iris is closed more for a brighter object, the reference voltage is controlled to be larger. The reference voltage is partially kept constant, though, the control is normally carried out.

Assuming that the camera is oriented to a brighter object than that imaged in a condition in which the iris control is balanced at point B in FIG. 3A, since the relation between V1 and $V_{ref}$ becomes V1>$V_{ref}$, the iris 2 is closed so that the detected voltage V1 is made lower. The reference voltage $V_{ref}$ is made higher accordingly. It results in reducing a difference between the detected voltage V1 and the reference voltage $V_{ref}$ and then keeping the balance between them at the equation of V1=$V_{ref}$. The balanced aperture value is made smaller than the value controlled by the prior art if the object and the background having the same brightness are to be imaged by this embodiment and the prior art. In addition, the prior art keeps the reference voltage constant. That is, when the balance is kept, the iris 2 is opened more than it is opened by the prior art, resulting in obtaining a slightly brighter regenerative screen. Conversely, assuming that the camera is oriented to a darker object than that providing the balance point B, the relation between V1 and $V_{ref}$ becomes V1<$V_{ref}$, with rise of V1, $V_{ref}$ drops accordingly. When the balance is kept, the iris 2 is closed more than it is closed by the prior art, resulting in obtaining a slightly less bright regenerative screen.

For example, as shown in FIG. 3A, (i) denotes an aperture value which is proper to imaging a lawn on an overall screen. (ii) denotes an aperture value which is proper to imaging blue sky on an overall screen. The present embodiment regenerates the blue sky on the screen more brightly than the prior art, while the present embodiment generates the lawn on the screen a little less brightly than the prior art, resulting in keeping the green luminance of the lawn proper without being faded out. That is, the present embodiment can provide a natural regenerative image for the blue sky and the lawn. It is true to the cases of FIGS. 3B and 3C.

Figure 4:
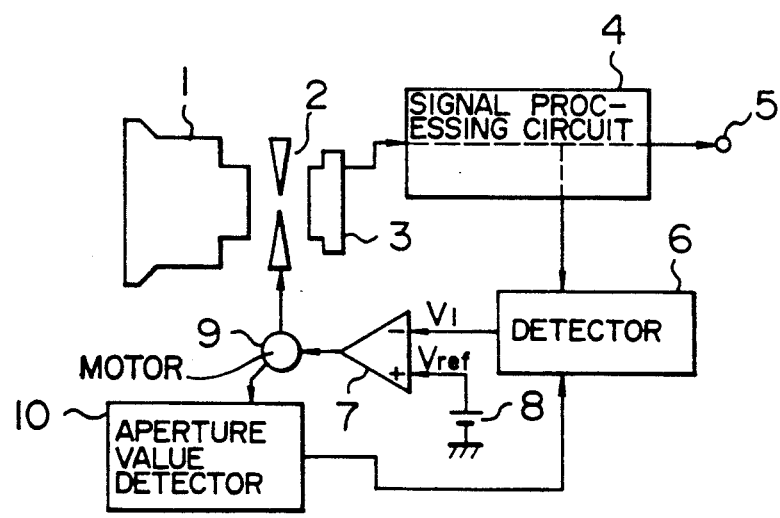
FIG. 4 is a block diagram showing an auto-iris apparatus for an imaging device according to another embodiment of the present invention.

FIG. 4 is a block diagram showing an auto-iris apparatus for an imaging device according to another embodiment of the present invention. The same components as those shown in FIGS. 1 and 2 are referenced by the same numbers and are not further discussed herein.

Figure 5:
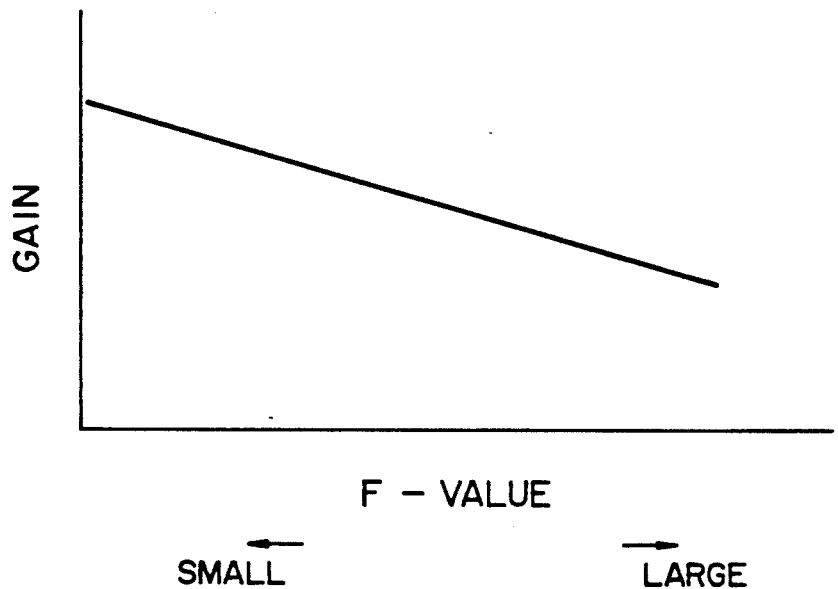
FIG. 5 is a plot showing relation an aperture value and a gain of a detected value according to the embodiment shown in FIG. 4.

As shown, the aperture value detector 10 feeds a detected output to the image detecting circuit 6. In the image detecting circuit 6, a signal gain is controlled depending on the detected output of the aperture value detector 10. As shown in FIG. 5, as the object is brighter and the aperture value is made larger, the signal gain is made smaller. In this case, the reference voltage $V_{ref}$ is kept constant.

Hence, assuming that V1>$V_{ref}$ is established by imaging an object brighter than that imaged up to now, the iris 2 is closed and the detected voltage V1 of the image detecting circuit 6 drops accordingly. The detected output of the aperture value detector 10, on the other hand, serves to close the iris 2, resulting in increasing the aperture value accordingly, thereby reducing a signal gain of the image detecting circuit 6. Hence, the detected voltage V1 drops as well. Then, when the balance is kept between the detected voltage and the reference voltage at the equation of V1=$V_{ref}$, the iris 2 is opened more than it is opened by the prior art which keeps the signal gain of the image detecting circuit 6 constant.

Conversely, assuming that V1<$V_{ref}$ is established by imaging an object darker than that imaged up to now, the iris 2 is opened so that V1 rises accordingly. With the rise of V1, the image detecting circuit 6 raises its signal gain. Hence, when the balance is kept between the detected voltage and the reference voltage, the iris 2 is closed more than it is closed by the prior art. The luminance signal obtained at the output terminal 5 in this embodiment is made smaller than that in the prior art.

Hence, the present embodiment has the same function and effect as the embodiment shown in FIG. 2.

Figure 6:
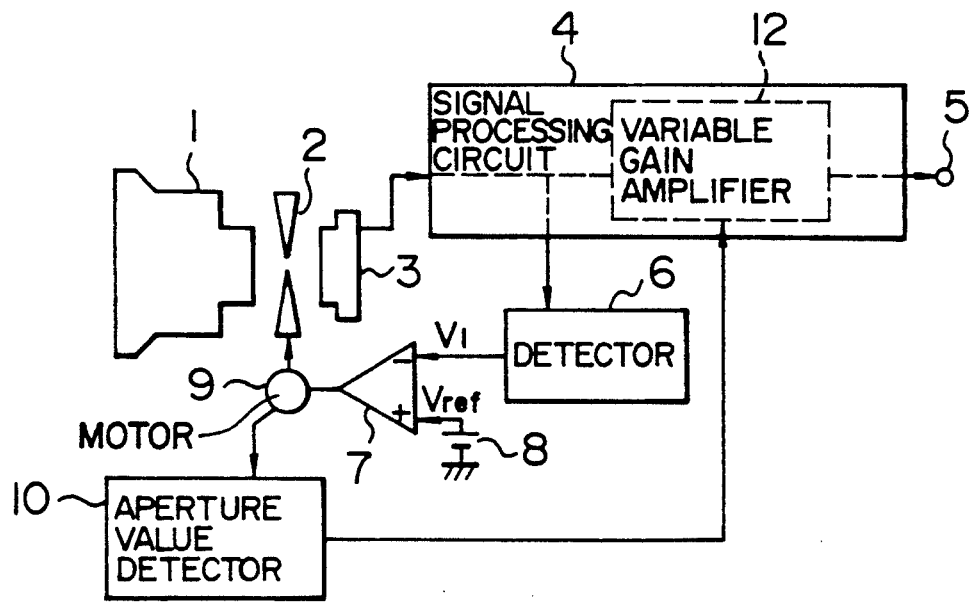
FIG. 6 is a block diagram showing an auto-iris apparatus for an imaging device according to another embodiment of the present invention.

FIG. 6 is a block diagram showing an auto-iris apparatus for an imaging device according to another embodiment of the present invention. In FIG. 6, 12 is a variable gain amplifier. The same components as those shown in FIGS. 1 and 2 are referenced by the same numbers and are not further described herein.

As shown, the signal processing circuit 4 provides the variable gain amplifier 12. The luminance signal is passed through the variable gain amplifier 12 and is used for regenerating the video signal. Further, the luminance signal fed at the input side of the variable gain amplifier 12 is fed to the image detecting circuit 6.

The gain of the variable gain amplifier 12 is controlled by the detected output of the aperture value detector 10. That is, as the object becomes brighter, the iris 2 can be closed more and as the aperture value is made larger, the gain becomes larger. In this case, however, the gain may be partially stable. The control of the iris 2 is true to the control done in the prior art shown in FIG. 1.

Assuming that $V1>V_{ref}$ is established, the iris is closed more so that the aperture value is made larger. The detected voltage V1 of the video detecting circuit 6 is made lower accordingly, resulting in the balance being kept at an equation of $V1=V_{ref}$. Hence, the variable gain amplifier 12 keeps the amplitude of the input luminance signal constant. Since, however, the gain of the variable gain amplifier 12 is set to a larger value by the detected output of the aperture value detector 10, the amplitude of the luminance signal output by the variable gain amplifier 12 is made larger than that of the luminance signal input thereto. It means that in case of imaging a relatively brighter scene, a brighter regenerative image can be provided than the image output by the prior art shown in FIG. 1.

Conversely, in case of imaging a relatively less bright scene, since the gain of the variable gain amplifier 12 is set to a smaller value, the amplitude of the luminance signal output by the variable gain amplifier 12 is made smaller than that of the luminance signal input thereto. Hence, a less bright regenerative image can be provided than the image output by the prior art shown in FIG. 1.

Figure 7:
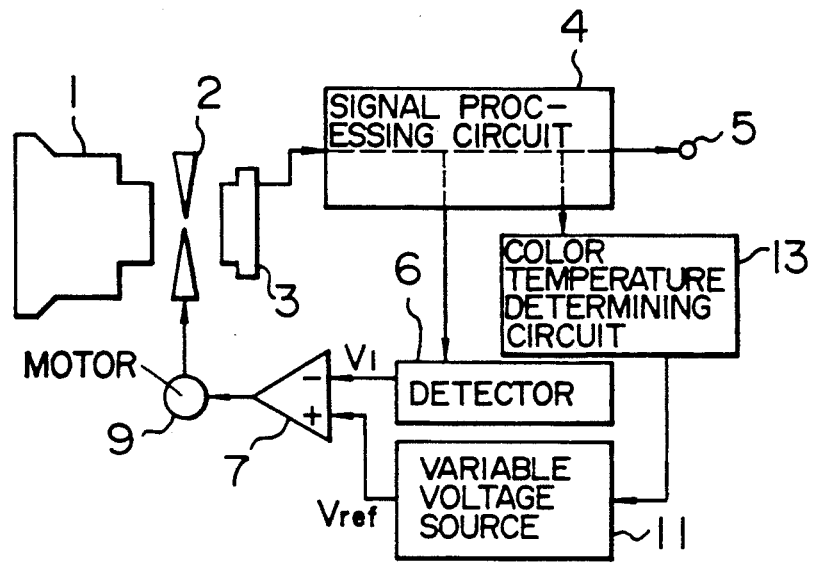
FIG. 7 is a block diagram showing an auto-iris apparatus for an imaging device according to another embodiment of the present invention.

FIG. 7 is a block diagram showing an auto-iris apparatus for an imaging device according to another embodiment of the present invention. In FIG. 7, 13 denotes a color temperature determining circuit. The other same components as those shown in FIG. 2 are referenced by the same numbers as those in FIG. 2 and are not further described herein.

The color temperature determining circuit 12 is essential to an auto-white balance adjusting mechanism generally provided in a video camera for domestic use. In this embodiment shown in FIG. 7, the variable reference voltage source 11 is controlled depending on the color temperature information obtained by the color temperature determining circuit 13 so as to change the reference voltage $V_{ref}$.

The color temperature is variable in each place such as outside or inside, each time such as midday, early morning or evening, each weather such as cloudy or fine day, or each lighting lamp such as an incandescent lamp or a fluorescent lamp. The reference voltage $V_{ref}$ may vary accordingly. Herein, the reference voltage $V_{ref}$ is made higher for a higher color temperature.

Considering that an object is imaged at midday or in the evening, for example, in case of imaging an object at midday when the color temperature is high, the reference voltage $V_{ref}$ is adjusted to be relatively higher so that the iris 2 is opened a bit more. In case of imaging an object in the evening when the color temperature is low, the reference voltage $V_{ref}$ is adjusted to be relatively lower so that the iris 2 is closed a bit more. Hence, at midday or in the evening, a natural image can be regenerated.

Figure 8:
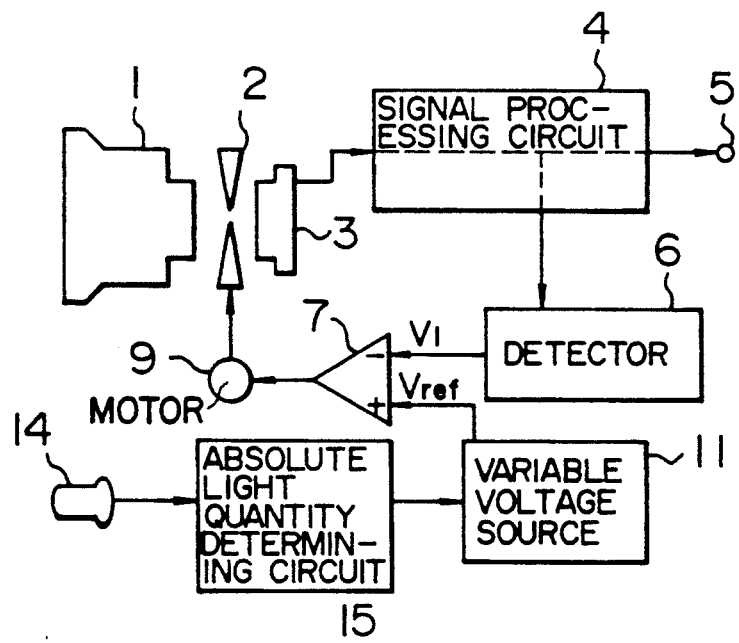
FIG. 8 is a block diagram showing an auto-iris apparatus for an imaging device according to another embodiment of the present invention.

FIG. 8 is a block diagram showing an auto-iris apparatus for an imaging device according to another embodiment of the present invention. 14 denotes an optical sensor and 15 denotes an absolute light quantity determining circuit. The other same components as those shown in FIG. 2 are referenced by the same numbers as those in FIG. 2 and are not further described herein.

As shown, the optical sensor 14 receives light from the scene to be imaged. The quantity of received light is determined by the absolute light quantity determining circuit 15. This determination is done for determining the absolute brightness of the object and the background thereof. Depending on the determined result of the absolute light quantity determining circuit 15, the variable reference voltage source 11 is controlled so as to change the reference voltage $V_{ref}$.

Herein, as the optical sensor 14 receives more light, that is, an object and the background thereof become brighter, the reference voltage $V_{ref}$ becomes higher. Like the foregoing embodiment, therefore, a natural image can be always regenerated. The output level of the optical sensor 14 is not necessarily proportional to the quantity of received light. The essential role of the optical sensor 14 is to determine the brightness of an object and the background thereof.

According to the foregoing embodiments, as shown in FIGS. 3A to 3C, the reference voltage $V_{ref}$ may be set to be continuously changed depending on the brightness of an object and the background thereof. Alternatively, it is possible to separate the brightness into two or more stages and to adjust the reference voltage $V_{ref}$ at each stage.

Also in the embodiments shown in FIGS. 7 and 8, it may be possible to control the gain of the variable gain amplifier included in the image detecting circuit 6 and the signal processing circuit 4.

What is claimed is:

1. An auto-iris method for an imaging device comprising the steps of:
   (a) obtaining a first signal indicating brightness of an object to be imaged from an output signal of an imaging element;
   (b) comparing a level of said first signal with a level of a reference signal; and
   (c) controlling an iris to pass a larger quantity of light to said imaging element as said object becomes brighter.

2. An auto-iris method according to claim 1, wherein said step of controlling said iris includes a step of enhancing a level of said reference signal more as an iris value becomes larger.

3. An auto-iris method according to claim 1, wherein said step of controlling said iris includes a step of lowering a gain of said first signal level as said iris value becomes larger.

4. An auto-iris method according to claim 1, further comprising a step of enhancing a gain of a level of a video signal obtained from a signal output from said imaging element more as said iris value becomes larger.

5. An auto-iris method according to claim 1, wherein said step of controlling said iris includes the steps of:
   detecting a color temperature from said signal output from said imaging element; and
   enhancing a level of said reference signal more as said color temperature becomes higher.

6. An auto-iris method according to claim 1, wherein said step of controlling said iris includes the steps of:
   detecting a color temperature from a signal output from said imaging element; and
   lowering a level of said first signal as said color temperature becomes higher.

7. An auto-iris method according to claim 1, wherein said step of controlling said iris includes the steps of:
   detecting a color temperature from a signal output from said imaging element; and
   enhancing a gain of a level of a video signal obtained from the output signal of said imaging element more as said color temperature becomes higher.

8. An auto-iris method according to claim 1, wherein said step of controlling said iris includes the steps of:
   detecting brightness of said object with an added optical detector; and
   enhancing a level of said reference signal more as brightness of said object determined from the output of said optical detector becomes brighter.

9. An auto-iris method according to claim 1, wherein said step of controlling said iris includes the steps of:
   detecting brightness of said object with an added optical detector; and
   lowering a level of said first signal as brightness of said object determined from the output of said optical sensor becomes brighter.

10. An auto-iris method according to claim 1, wherein said step of controlling said iris includes the steps of:
    detecting brightness of said object with an added optical detector; and
    enhancing a gain of a level of a video signal obtained from a signal output of said imaging element more as the brightness of said object determined from the output of said optical detector becomes brighter.

11. An auto-iris apparatus for an imaging device comprising:
    (1) means for detecting an amplitude of a video signal generated from a signal output from an imaging element;
    (2) means for comparing a detected voltage with a reference voltage; and
    (3) means for controlling an iris to pass a greater quantity of light to said imaging device as said detected voltage becomes higher, based on the output of said comparing means.

12. An auto-iris apparatus according to claim 11, wherein said means for controlling said iris includes:
    means for detecting an aperture value of said iris; and
    means for enhancing said reference voltage as said aperture value becomes larger.

13. An auto-iris apparatus according to claim 11, wherein said means for controlling said iris includes:
    means for detecting an aperture value of said iris; and
    means for lowering a gain of said detected voltage as said aperture value becomes larger.

14. An auto-iris apparatus according to claim 11, wherein said means for controlling said iris includes:
    means for detecting an aperture value of said iris; and
    means for enhancing a gain of a level of said video signal more as said aperture value becomes larger.

15. An auto-iris apparatus according to claim 11, wherein said means for controlling said iris includes:
    means for detecting a color temperature from said video signal; and
    means for enhancing a level of said reference voltage as said color temperature becomes higher.

16. An auto-iris apparatus according to claim 11, wherein said means for controlling said iris includes:
    means for detecting a color temperature from said video signal; and
    means for lowering a level of said detected voltage as said color temperature becomes higher.

17. An auto-iris apparatus according to claim 11, wherein said means for controlling said iris includes:
    means for detecting a color temperature from said video signal; and
    means for enhancing a gain of a level of said video signal more as said color temperature becomes higher.

18. An auto-iris apparatus according to claim 11, wherein said means for controlling said iris includes:
    means for detecting brightness of said object; and
    means for enhancing a level of said reference voltage more as said object has more brightness.

19. An auto-iris apparatus according to claim 11, wherein said means for controlling said iris includes:
    means for detecting brightness of said object; and
    means for lowering a level of said detected voltage as said object has more brightness.

20. An auto-iris apparatus according to claim 11, wherein said means for controlling said iris includes:
    means for detecting brightness of said object; and
    means for enhancing a gain of a level of said video signal as said object has more brightness.

21. An auto-exposure control method for an imaging device, comprising the steps of:
    (a) obtaining a first signal indicating brightness of an object to be imaged;
    (b) obtaining a second signal corresponding to a level of a first video signal obtained from an output signal of an imaging element;
    (c) comparing a level of said second signal with a level of a reference signal; and
    (d) controlling an exposure on the basis of said first signal via said comparing step such that as said object becomes brighter, a level of a second video signal, which is outputted from said imaging device, becomes larger.

22. An auto-exposure control method according to claim 21, wherein said step of controlling said exposure comprises a step of enhancing the level of said reference signal as an iris value becomes larger.

23. An auto-exposure control method according to claim 21, wherein said step of controlling said exposure comprises a step of lowering the level of said second signal as an iris value becomes larger.

24. An auto-exposure control method according to claim 21, wherein said step of controlling said exposure comprises a step of enhancing the level of said second video signal after said second signal is detected, as an iris value becomes larger.

25. An auto-exposure control method according to claim 21, wherein said step of obtaining the first signal comprises a step of detecting a color temperature from said output signal of said imaging element, and said step of controlling said exposure comprises a step of enhancing the level of said reference signal as said color temperature increases.

26. An auto-exposure control method according to claim 21, wherein said step of obtaining the first signal comprises a step of detecting a color temperature from said output signal of said imaging element, and said step of controlling said exposure comprises a step of lowering the level of said second signal as said color temperature increases.

27. An auto-exposure control method according to claim 21, wherein said step of obtaining the first signal comprises a step of detecting a color temperature from said output signal of said imaging element, and said step of controlling said exposure comprises a step of enhancing the level of said second video signal after said second signal is detected, as said color temperature increases.

28. An auto-exposure control method according to claim 21, wherein said step of obtaining the first signal comprises a step of detecting brightness of said object by an optical sensor, and said step of controlling said exposure comprises a step of enhancing the level of said reference signal as the brightness detected by said optical sensor increases.

29. An auto-exposure control method according to claim 21, wherein said step of obtaining the first signal comprises a step of detecting brightness of said object by an optical sensor, and said step of controlling said exposure comprises a step of lowering the level of said second signal as the brightness detected by said optical sensor increases.

30. An auto-exposure control method according to claim 21, wherein said step of obtaining the first signal comprises a step of detecting brightness of said object by an optical sensor, and said step of controlling said exposure comprises a step of enhancing the level of said second video signal after said second signal is detected as the brightness detected by said optical sensor increases.

31. An auto-exposure controlling apparatus for an imaging device, comprising:
   (1) an iris for controlling the amount of light which reaches an imaging element;
   (2) means for driving said iris;
   (3) means for outputting a first signal indicating brightness of an object to be imaged;
   (4) means for outputting a second signal corresponding to a level of a first video signal obtained from an output signal of said imaging element;
   (5) means for comparing the level of said second signal with a reference voltage, and for outputting a signal to said means for driving said iris; and
   (6) means for controlling an exposure on the basis of said first signal such that as the brightness of said object increases, a level of a second video signal, which is outputted from said imaging device becomes larger.

32. An auto-exposure controlling apparatus according to claim 31, wherein said means for outputting said first signal comprises means for detecting an aperture value of said iris, and said means for controlling said exposure comprises means for enhancing said reference voltage as said aperture value becomes larger.

33. An auto-exposure controlling apparatus according to claim 31, wherein said means for outputting said first signal comprises means for detecting an aperture value of said iris, and said means for controlling said exposure comprises means for lowering said level of said second signal as said aperture value becomes larger.

34. An auto-exposure controlling apparatus according to claim 31, wherein said means for outputting said first signal comprises means for detecting an aperture value of said iris, and said means for controlling said exposure comprises means for enhancing said level of said second video signal after said second signal is detected, as said aperture value becomes larger.

35. An auto-exposure controlling apparatus according to claim 31, wherein said means for outputting said first signal comprises means for detecting a color temperature from said video signal, and said means for controlling said exposure comprises means for enhancing said reference voltage as said color temperature increases.

36. An auto-exposure controlling apparatus according to claim 31, wherein said means for outputting said first signal comprises means for detecting a color temperature from said video signal, and said means for controlling said exposure comprises means for lowering said level of said second signal as said color temperature increases.

37. An auto-exposure controlling apparatus according to claim 31, wherein said means for outputting said first signal comprises means for detecting a color temperature from said video signal, and said means for controlling said exposure comprises means for enhancing said level of said second video signal after said second signal is detected, as said color temperature increases.

38. An auto-exposure controlling apparatus according to claim 31, wherein said means for outputting said first signal comprises a detector for detecting brightness of said object, and said means for controlling said exposure comprises means for enhancing said reference voltage as the output of said detector represents that the brightness of said object increases.

39. An auto-exposure controlling apparatus according to claim 31, wherein said means for outputting said first signal comprises means for detecting brightness of said object, and said means for controlling said exposure comprises means for lowering said level of said second signal as the output of said detector represents that the brightness of said object increases.

40. An auto-exposure controlling apparatus according to claim 31, wherein said means for outputting said first signal comprises means for detecting brightness of said object, and said means for controlling said exposure comprises means for enhancing said level of said second video signal after said second signal is detected, as the output of said detector represents that the brightness of said object increases.

* * * * *